United States Patent Office 2,857,391
Patented Oct. 21, 1958

2,857,391

AMINOMETHYLBENZIMIDAZOLES

Edward L. Engelhardt, Gwynedd Valley, and Howard C. Zell, Ambler, Pa., assignors to Merck & Co., Inc., Rahway, N. J., a corporation of New Jersey No Drawing. Application April 15, 1955
Serial No. 501,728

10 Claims. (Cl. 260—294.7)

This invention is concerned with benzimidazoles and in particular with 2-aminomethylbenzimidazoles and especially those compounds wherein the amino group attached to the methylene radical is a tertiary amino group, and to novel methods for preparing these compounds.

The 2-aminomethylbenzimidazoles of this invention can be represented by the following structural formula:

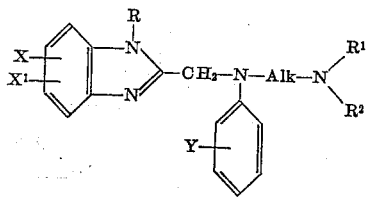

the acid addition salts and the quaternary ammonium derivatives thereof, wherein X and $X^1$ each represents hydrogen, halogen, e. g., chlorine, bromine, iodine or fluorine, an alkyl radical, advantageously a lower-alkyl radical, preferably having from 1 to 4 carbon atoms, or an alkoxy radical, advantageously a lower-alkoxy and preferably an alkoxy radical having from 1 to 4 carbon atoms; R is hydrogen or a lower-alkyl radical preferably one having from 1 to 4 carbon atoms; Alk is a straight or branched chain alkylene group advantageously having from 1 to 4 carbon atoms;

is a tertiary amino radical, preferably a di-lower alkyl amino radical wherein each of the alkyl radicals preferably has from 1 to 4 carbon atoms or a nitrogen-containing heterocyclic radical containing 5 or 6 atoms in the heterocyclic ring such as a pyrrolidyl, piperidyl or morpholinyl radical; and Y represents hydrogen, halogen, e. g., chlorine, bromine, iodine or fluorine, an alkyl radical advantageously having from 1 to 4 carbon atoms, or a lower-alkoxy radical preferably having from 1 to 4 carbon atoms. Any one or more of the alkyl or alkoxy radicals represented by the variable radicals X, $X^1$, R, $R^1$ and $R^2$ can be either straight or branched chain.

The compounds of this invention are useful as therapeutic agents particularly in the field of anesthetic and antifibrillatory agents. Many of the compounds possess the desirable property of exhibiting local anesthetic activity of relatively long duration.

Several novel processes have been developed for making the compounds of this invention. While substantially all of the compounds falling within the scope of this invention can be made by each of the new methods, some are produced in greater yield by one method than by another.

METHOD A

One method by which the compounds of this invention can be prepared comprises reducing a N-(2-benzimidazolylmethyl)-N-phenylglycinamide with lithium aluminum hydride under anhydrous conditions to produce the 2-aminomethylbenzimidazole compounds of this invention. The following reaction scheme graphically illustrates this method:

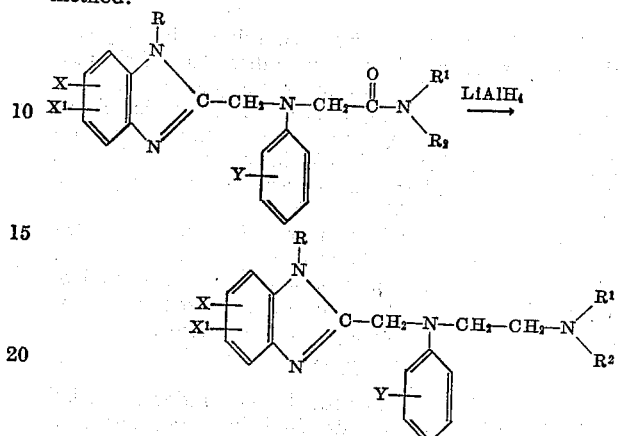

The lithium aluminum hydride reduction of the glycinamide is accomplished by dissolving the amide and the reducing agent in an anhydrous inert solvent and then heating advantageously under reflux conditions. The end product can be separated by decomposing the lithium aluminum hydride, removing the precipitate and recovering the desired 2-aminomethylbenzimidazole from the filtrate by removal of the solvent.

Solvents that have been found suitable for this reduction are tetrahydrofuran, dioxane or mixtures of the two. Other solvents such as 1,2-dimethoxyethane and N-ethylmorpholine also may be employed. In general, a solvent should be selected in which both the amide and the reducing agent are each soluble. As the amount of amide which can be dissolved in solvents suitable for dissolving the reducing agent varies, it is necessary to determine the best solvent for the particular amide which is to be reduced.

The N-(2-benzimidazolylmethyl)-N-phenylglycinamide, employed as the starting material above, can be made by one of several methods. One such method comprises condensing a 2-chloromethylbenzimidazole with a lower-alkyl N-phenylglycinate in the presence of a catalytic amount of sodium iodide and a polar anhydrous solvent such as anhydrous ethanol or methanol. The alkyl N-(2-benzimidazolylmethyl)-N-phenylglycinate thus obtained can then be condensed with a secondary amine, advantageously with heating, thus forming the desired N-(2-benzimidazolylmethyl)-N-phenylglycinamide.

METHOD B

A second method devised for preparing the compounds of this invention comprises condensing a 2-halomethylbenzimidazole wiith a diamine, advantageously in the form of its monoacid addition salt and if desired using an excess, for example two or more moles of the diamine mono salt for each mole of the halomethyl compound. This reaction is carried out in the presence of a catalytic amount of sodium iodide and in a polar anhydrous solvent. This method can be graphically illustrated by the following reaction scheme:

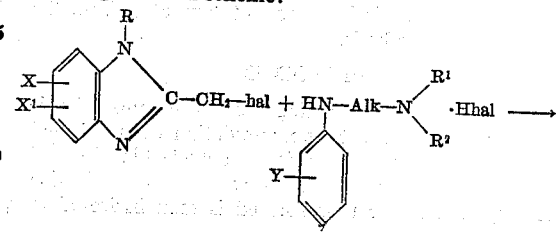

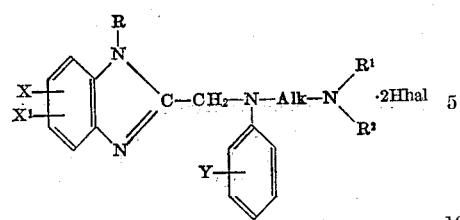

The acid employed to form the salt of the alkylenediamine can be a mineral acid other than nitric acid such as hydrochloric, sulfuric or phosphoric acid or a sulfonic acid or a carboxylic acid such as oxalic acid or acetic acid. In practice a mixture of equimolecular quantities of the diamine and its di-mineral acid addition salt is employed and when a carboxylic acid is employed an excess of the acid would be desirable.

The reaction proceeds with or without heat but preferably at 50–100° C., and advantageously in the presence of an anhydrous solvent, especially absolute alcohol or acetonitrile. Other solvents that can be used are methyl alcohol and mixtures of alcohol and acetone.

METHOD C

A third method, suitable for the preparation of 1-alkyl derivatives of the compounds of this invention, comprises first preparing the metal derivative of the appropriate alkylenediamine by means of an alkali metal amide such as lithium amide or sodium amide, or an alkyl- or aryllithium reagent such as butyllithium or phenyllithium or the like, which metal derivative then is condensed with the selected 1-alkyl-2-halomethylbenzimidazole thus forming the desired product. This reaction can be illustrated as follows:

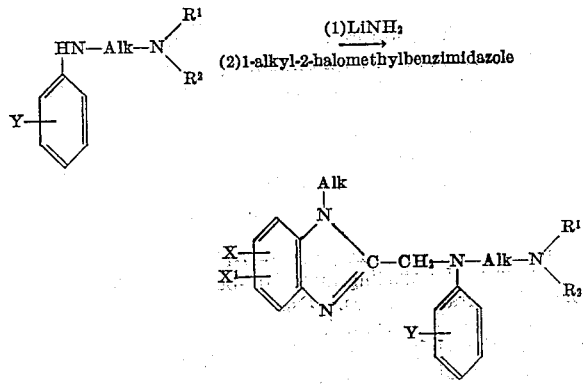

The metal derivative of the alkylenediamine is prepared from the metal amide by heating the reactants in the presence of toluene or other hydrocarbon solvent at a temperature of about 100° C. until evolution of ammonia is complete. The metal derivative is prepared from the alkyl- or aryllithium by adding one equivalent of the alkyl- or aryllithium in the presence of an inert solvent such as dibutyl ether or a mixture of an ether and an hydrocarbon solvent, e. g., benzene, toluene or the like. The addition of the 1-alkyl-2-halomethyl benzimidazole generally evolves heat and when this occurs the reaction flask should be cooled to maintain the temperature at about 25 to 35° C. After the addition of the benzimidazole is completed, the mixture can be heated, advantageously at 100–120° C. for a period of approximately an hour. The lithium chloride formed is removed by filtration and the desired product separated from the solvent by known methods.

METHOD D

A fourth method for making the compounds of this invention comprises the cyanomethylation of a selected alkylenediamine by means of formaldehyde bisulfite and an alkali metal cyanide. The N-cyanomethyl derivative of the alkylenediamine thus formed is then hydrated to the corresponding carbamylmethyl derivative. The N-carbamylmethylalkylenediamine thus formed is then condensed with an o-phenylenediamine to form the 2-aminomethylbenzimidazoles of this invention. This method can be illustrated as follows:

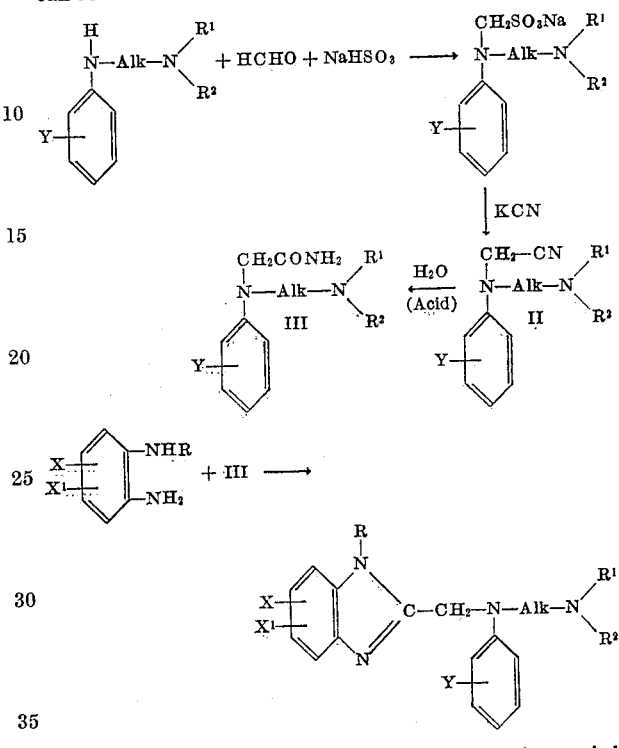

The cyanomethylation step is advantageously carried out with heating in an aqueous medium. Any alkali metal bisulfite can be employed to form the formaldehyde bisulfite addition compound, although sodium bisulfite is generally most readily accessible. The alkali metal cyanide employed in this reaction advantageously can be the sodium or potassium cyanide.

The hydration is preferably accomplished with concentrated sulfuric acid at temperatures below 60° C. and preferably between about 25 and 50° C.

The condensation of III with the o-phenylenediamine is preferably carried out by dissolving the reactants in a high boiling solvent, such as ethylene glycol, at temperatures in the vicinity of 200° C.

The acid addition salts and the quaternary ammonium derivatives of the 2-aminomethylbenzimidazoles are prepared by methods well known to chemists. The acid addition salts, for example, are prepared by dissolving the compounds in alcohol and adding the calculated quantity of the desired acid. The salt is isolated by evaporating the solvent and can be recrystallized from a suitable solvent such as a mixture of alcohol and ether. The quaternary ammonium derivative can be prepared by dissolving the compound in a suitable solvent such as an absolute alcohol and adding the desired quaternizing agent.

Each of the above methods A to D, as well as the preparation of the acid addition salts and the quaternary ammonium derivatives, will be illustrated by the following examples, while the examples describe the optimal conditions for each method, modifications within the above described conditions can be made without departing from the scope of this invention.

METHOD A

Example 1.—N-(2-benzimidazolylmethyl)-N-phenyl-N', N'-dimethylethylenediamine

Step A.—2-chloromethylbenzimidazole, 246 g. (1.48 mole), was added to a solution of 11.1 g. (0.074 mole) of sodium iodide in 300 ml. of absolute alcohol. Ethyl N- phenylglycinate, 264.5 g. (1.48 mole), was added followed by 880 ml. of absolute ethanol. The mixture was stirred and heated to refluxing for 18½ hours. The solvent was evaporated on the steam-bath under reduced pressure. The residue was treated with 6 N hydrochloric acid but was only slightly soluble. The acid solution and the acid insoluble fraction were treated with sodium hydroxide and extracted with benzene. The benzene extracts were concentrated and diluted with hexane. The combined products, M. P. 170–173° C., weighed 261.6 g. (57%). Recrystallization from benzene-hexane gave 46% of ethyl-N-(2-benzimidazolylmethyl)-N-phenylglycinate, M. P. 174–176° C.

*Analysis.*—Calculated for $C_{18}H_{19}O_2N_3$: C, 69.88; H, 6.19; N, 13.58. Found: C, 69.95; H, 6.13; N, 13.49.

Step B.—Eighteen and one-half grams (0.0598 mole) of the thus obtained ethyl N-(2-benzimidazolylmethyl)-N-phenylglycinate was dissolved in 170 ml. of absolute methanol. The solution, contained in a glass liner, was cooled to 0° C. in an ice-salt bath and 82.0 g. (1.82 moles) of liquid dimethylamine added with stirring. The solution then was heated to 120° C. for 4 hours in an autoclave. After evaporation of the solvent on the steam-bath the residue was crystallized from a mixture of methanol and water to give 10.76 g. (59%) of N-(2-benzimidazolylmethyl)-N-phenylglycine dimethylamide, M. P. 183–184° C.

*Analysis.*—Calculated for $C_{18}H_{20}ON_4$: C, 70.10; H, 6.55; N, 18.17. Found: C, 69.64; H, 6.74; N, 18.05.

Step C.—Lithium aluminum hydride, 9.75 g. (0.257 mole), was pulverized and added to 220 ml. of dry tetrahydrofuran. The mixture was stirred and refluxed for 30 minutes. A solution of N-(2-benzimidazolylmethyl)-N-phenylglycine dimethylamide, 11.5 g. (0.0378 mole) in 320 ml. of dry tetrahydrofuran was added at such a rate that gentle refluxing was maintained. The addition required 30 minutes. The mixture was stirred at room temperature for 1 hour followed by refluxing with stirring for 2½ hours. The excess lithium aluminum hydride was decomposed by the gradual addition of 28.7 g. of ethyl acetate followed by 6 ml. of water. The precipitate was collected and washed with tetrahydrofuran. Evaporation of the combined filtrate and washings gave a gray solid that was dissolved in dilute hydrochloric acid and the solution added to an excess of 10 N sodium hydroxide. A crystalline product was obtained, wt. 6.21 g., M. P. 177–179° C. The filter cake was treated similarly to give 1.1 g. of product, M. P. 185–187° C. The combined products were recrystallized from a mixture of alcohol and water to give 5.68 g. (51%) of N-(2-benzimidazolylmethyl)-N-phenyl-N',N'-dimethylethylenediamine, M. P. 188–190° C. After a second recrystallization the product melted at 189–190° C.

*Analysis.*—Calculated for $C_{18}H_{22}N_4$: C, 73.43; H, 7.53; N, 19.03. Found: C, 73.48; H, 7.61; N, 18.97.

*Example II.—N-(2-benzimidazolylmethyl)-N-phenyl-2-(1-piperidyl)-ethylamine*

Ethyl N-(2-benzimidazolylmethyl)-N-phenylglycinate, 10.0 g. (0.0324 mole) prepared as described in Step A of Example I, and piperidine, 5.7 g. (0.0648 mole) were dissolved in 150 ml. of toluene. The mixture was heated to refluxing under a 37 cm. Vigreux column equipped with a total reflux-partial take off still head. After refluxing for 24 hours with periodic removal of distillate, elimination of alcohol was complete. A pale yellow solid began to separate from the hot reaction mixture. After cooling to room temperature, the product was collected and dried at 70° C. to give 9.56 g. (85%) of N-(2-benzimidazolylmethyl) - N - phenylglycine piperamide, M. P. 220–221° C. (dec.). Recrystallization from a methanol-water mixture gave material melting at 223–225° C. (dec.).

*Analysis.*—Calculated for $C_{21}H_{24}ON_4$: C, 72.38; H, 6.84; N, 16.08. Found: C, 72.13; H, 6.99; N, 16.03.

The N-(2-benzimidazolylmethyl)-N-phenylglycine piperamide was reduced with lithium aluminum hydride by substantially the same procedure described in Step C, Example I, except that a mixture of dioxane and tetrahydrofuran was employed as solvent, yielding N-(2-benzimidazolylmethyl) - N - phenyl - 2 - (1 - piperidyl)-ethylamine, M. P. 149–150° C.

*Analysis.*—Calculated for $C_{21}H_{26}N_4$: C, 75.41; H, 7.84; N, 16.75. Found: C, 75.63; H, 7.90; N, 16.68.

METHOD B

*Example III.—N-(2-benzimidazolylmethyl)-N-phenyl-N',N'-dimethylethylenediamine*

Sodium iodide, 0.46 g. (0.00304 mole), was dissolved in approximately 20 ml. of absolute alcohol. 2-chloromethylbenzimidazole, 10.15 g. (0.061 mole), was added with 20 ml. of absolute alcohol, followed by 7.22 g. (0.0305 mole) of N-phenyl-N',N'-dimethylethylenediamine dihydrochloride and 5.0 g. (0.0305 mole) of N-phenyl-N',N'-dimethylethylenediamine and 20 ml. of absolute alcohol. The mixture was refluxed with stirring for 18½ hours, then filtered to remove a small amount of a white solid. The solvent was evaporated on the steam-bath under reduced pressure, the residue taken up in 100 ml. of water and an insoluble yellow solid separated by filtration. The solution was made basic and the mixture, containing an amorphous precipitate, extracted with four 100 ml. portions of benzene. After evaporation of the benzene, the residue was recrystallized from a mixture of alcohol and water to give 3.97 g. (22%) of N-(2-benzimidazolylmethyl)-N-phenyl-N',N'-dimethylethylenediamine, M. P. 189–190° C.

*Example IV.—N-(2-benzimidazolylmethyl)-N-phenyl-N',N'-dimethylethylenediamine*

The process described in Example III was repeated with the exception that the absolute alcohol used as the solvent in the reaction was replaced by 3.3 volumes of acetonitrile for each volume of alcohol. The yield of N - (2 - benzimidazolylmethyl) - N - phenyl - N',N' - dimethylethylenediamine, M. P. 186–187° C., was 27%. After recrystallization from alcohol-water, the material melted at 189–190° C.

*Example V.—N-(2-benzimidazolylmethyl)-N-phenyl-N',N'-diethylethylenediamine*

By replacing the N-phenyl-N',N'-dimethylethylenediamine hydrochloride in Example III by the same molar quantity of N-phenyl-N',N'-diethylethylenediamine hydrochloride, and following substantially the same procedure described in Example III, there was obtained N-(2-benzimidazolylmethyl) - N - phenyl - N',N' - diethylethylenediamine, M. P. 93–94° C.

*Analysis.*—Calculated for $C_{20}H_{26}N_4$: C, 74.73; H, 8.15; N, 17.43. Found: C, 74.46; H, 7.99; N, 17.35.

*Example VI.—N-(2-benzimidazolylmethyl) - N - phenyl-N'-N'-di-n-propylethylenediamine dipicrate*

By replacing the N-phenyl -N',N'-dimethylethylenediamine hydrochloride in Example III by the same molar quantity of N-phenyl-N',N'-di-n-propylethylenediamine hydrochloride, and following substantially the same procedure described in Example III, there was obtained N - (2 - benzimidazolylmethyl) - N - phenyl - N',N'-di-n-propylethylenediamine. The N-(2-benzimidazolylmethyl) - N - phenyl - N',N' - di - n - propylethylenediamine was isolated as the dipicrate, M. P. 179–180° C.

*Analysis.*—Calculated for $C_{22}H_{30}N_4 \cdot 2C_6H_3O_7N_3$: C, 50.49; H, 4.48; N, 17.31. Found: C, 50.66; H, 4.43; N, 17.22.

*Example VII.—N-(2-benzimidazolylmethyl)-N-phenyl-2-(1-piperidyl)-ethylamine*

By replacing the N-phenyl-N',N'-dimethylethylenediamine hydrochloride in Example III by the same molar quantity of N-phenyl-2-(1-piperidyl)-ethylamine hydrochloride, and following substantially the same procedure described in Example III, there was obtained N-(2-benzimidazolylmethyl) - N - phenyl - 2(1 - piperidyl)-ethylamine, M. P. 148–149° C.

*Example VIII.—N-(2-benzimidazolylmethyl)-N-phenyl-2-(4-morpholinyl)-ethylamine*

By replacing the N-phenyl-N',N'-dimethylethylenediamine hydrochloride in Example III by the same molar quantity of N-phenyl-2-(4-morpholinyl)-ethylamine hydrochloride, and following substantially the same procedure described in Example III, there was obtained N - (2 - benzimidazolylmethyl) - N - phenyl - 2 - (4 - morpholinyl)-ethylamine, M. P. 178–179° C.

*Analysis.*—Calculated for $C_{20}H_{24}ON_4$: C, 71.39; H, 7.19; N, 16.65. Found: C, 71.59; H, 7.16; N, 16.56.

*Example IX.—N-(2-benzimidazolylmethyl)-N-(p-chlorophenyl)-N',N'-dimethylethylenediamine*

By replacing the N-phenyl-N',N'-dimethylethylenediamine hydrochloride in Example III by the same molar quantity of N-(p-chlorophenyl)-N',N'-dimethylethylenediamine hydrochloride, and following substantially the same procedure described in Example III, there was obtained N - (2 - benzimidazolylmethyl) - N - (p - chlorophenyl) - N',N' - dimethylethylenediamine, M. P. 234–235° C.

*Analysis.*—Calculated for $C_{18}H_{21}N_4Cl$: C, 65.74; H, 6.44; N, 17.04. Found: C, 65.63; H, 6.39; N, 17.03.

*Example X.—N-(2-benzimidazolylmethyl)-N-(p-chlorophenyl)-2-(1-piperidyl)-ethylamine*

By replacing the N-phenyl-N',N'-dimethylethylenediamine hydrochloride in Example III by the same molar quantity of N - (p - chlorophenyl) - 2 - (1 - piperidyl)-ethylamine hydrochloride, and following substantially the same procedure described in Example III, there was obtained N - (2 - benzimidazolylmethyl) - N - (p - chlorophenyl) - 2 - (1 - piperidyl) - ethylamine, M. P. 228–229° C. (dec.).

*Analysis.*—Calculated for $C_{21}H_{25}N_4Cl$: C, 68.37; H, 6.83; N, 15.19. Found: C, 68.36; H, 6.62; N, 15.20.

*Example XI.—N-(2-benzimidazolylmethyl)-N-(p-methoxyphenyl)-N',N'-diethylethylenediamine*

By replacing the N-phenyl-N',N'-dimethylethylenediamine hydrochloride in Example III by the same molar quantity of N - (p - methoxyphenyl) - N',N' - diethylethylenediamine hydrochloride, and following substantially the same procedure described in Example III, there was obtained N - (2 - benzimidazolylmethyl) - N - (p-methoxyphenyl) - N',N' - diethylethylenediamine, M. P. 113–114° C.

*Analysis.*—Calculated for $C_{21}H_{28}ON_4$: C, 71.56; H, 8.01; N, 15.87. Found: C, 71.82; H, 7.85; N, 15.92.

*Example XII.—N-(2-benzimidazolylmethyl)-N-(p-methoxyphenyl)-2-(1-piperidyl)-ethylamine*

By replacing the N-phenyl-N',N'-dimethylethylenediamine hydrochloride in Example III by the same molar quantity of N - (p - methoxyphenyl) - 2 - (1 - piperidyl)-ethylamine hydrochloride, and following substantially the same procedure described in Example III, there was obtained N - (2 - benzimidazolylmethyl) - N - (p - methoxyphenyl)-2-(1-piperidyl)-ethylamine, M. P. 174–175° C.

*Analysis.*—Calculated for $C_{22}H_{28}ON_4$: C, 72.49; H, 7.74; N, 15.37. Found: C, 72.23; H, 7.63; N, 15.40.

*Example XIII.—N-(2-benzimidazolylmethyl)-N-(p-methoxyphenyl)-2-(4-morpholinyl)-ethylamine*

By replacing the N-phenyl-N',N'-dimethylethylenediamine hydrochloride in Example III by the same molar quantity of N-(p-methoxyphenyl)-2-(4-morpholinyl)-ethylamine hydrochloride, and following substantially the same procedure described in Example III, there was obtained N - (2 - benzimidazolylmethyl) - N - (p - methoxyphenyl)-2-(4-morpholinyl)-ethylamine, M. P. 166–167° C.

*Analysis.*—Calculated for $C_{21}H_{26}O_2N_4$: C, 68.83; H, 7.15; N, 15.29. Found: C, 68.90; H, 7.21; N, 15.33.

*Example XIV.—N-(1-methyl-2-benzimidazolylmethyl)-N-phenyl-N',N'-diethylethylenediamine*

By replacing the 2-chloromethylbenzimidazole and the N-phenyl-N',N'-dimethylethylenediamine hydrochloride employed in Example III by equimolecular quantities of 1-methyl-2-chloromethylbenzimidazole and N-phenyl-N',N'-diethylethylene-diamine hydrochloride respectively and following substantially the same procedure described in Example III, there was obtained N - (1 - methyl - 2-benzimidazolylmethyl) - N - phenyl - N',N' - diethylethylenediamine, M. P. 89–90° C.

*Analysis.*—Calculated for $C_{21}H_{28}N_4$: C, 74.95; H, 8.39; N, 16.66. Found: C, 74.79; H, 8.56; N, 16.72.

*Example XV.—N-(1-methyl-2-benzimidazolylmethyl)-N-phenyl-N',N'-di-n-propylethylenediamine*

By replacing the 2-chloromethylbenzimidazole and the N-phenyl-N',N'-dimethylethylenediamine hydrochloride employed in Example III by equimolecular quantities of 1-methyl-2-chloromethylbenzimidazole and N-phenyl-N',N'-di-n-propylethylenediamine hydrochloride respectively and following substantially the same procedure described in Example III, there was obtained N-(1-methyl-2 - benzimidazolylmethyl) - N - phenyl - N',N' - di - n-propylethylenediamine. The N-(1-methyl-2-benzimidazolylmethyl) - N - phenyl - N',N' - di - n - propylethylenediamine was isolated as the water-soluble mono-hydrobromide.

*Analysis.*—Calculated for $C_{23}H_{32}N_4 \cdot HBr$: C, 62.01; H, 7.49; N, 12.58. Found: C, 62.06; H, 7.41; N, 12.41.

*Example XVI.—N-(1-methyl-2-benzimidazolymethyl)-N-phenyl-2-(1-piperidyl)-ethylamine*

By replacing the 2-chloromethylbenzimidazole and the N-phenyl-N',N'-dimethylethylenediamine hydrochloride employed in Example III by equimolecular quantities of 1-methyl-2-chloromethylbenzimidazole and N-phenyl-2-(1-piperidyl)-ethylamine hydrochloride respectively and following substantially the same procedure described in Example III, there was obtained N-(1-methyl-2-benzimidazolylmethyl)- N-phenyl- 2-(1-piperidyl)- ethylamine, M. P. 124-125° C.

*Analysis.*—Calculated for $C_{22}H_{28}N_4$: C, 75.82; H, 8.10; N, 16.08. Found: C, 75.99; H, 8.08; N, 16.02.

*Example XVII.—N-(1-methyl-2- benzimidazolylmethyl)-N-phenyl-2-(4-morpholinyl)-ethylamine*

By replacing the 2-chloromethylbenzimidazole and the N-phenyl-N',N'-dimethylethylenediamine hydrochloride employed in Example III by equimolecular quantities of 1-methyl-2-chloromethylbenzimidazole and N-phenyl-2-(4-morpholinyl)-ethylamine hydrochloride respectively and following substantially the same procedure described in Example III, there was obtained N-(1-methyl-2-benzimidazolylmethyl) - N - phenyl-2-(4-morpholinyl)-ethylamine, M. P. 124–125° C.

*Analysis.*—Calculated for $C_{21}H_{26}ON_4$: C, 71.97; H, 7.48; N, 15.99. Found: C, 71.71; H, 7.23; N, 16.00.

*Example XVIII.—N - [5(6) - chloro- 2- benzimidazolylmeth]-N-phenyl-N',N'-dimethyl-1,3-propanediamine*

By replacing the 2-chloromethylbenzimidazole and the N-phenyl-N',N'-dimethylethylenediamine hydrochloride employed in Example III by equimolecular quantities of 5(6)-chloro-2-chloromethylbenzimidazole and N-phenyl-N',N'-dimethyl-1,3-propanediamine hydrochloride respectively and following substantially the same procedure described in Example III, there was obtained N-[5(6)-chloro-2- benzimidazolylmethyl]- N-phenyl- N',N'-dimethyl-1,3-propanediamine, M. P. 200–201° C.

*Analysis.*—Calculated for $C_{19}H_{23}N_4Cl$: C, 66.55; H, 6.76; N, 16.34. Found: C, 66.61; H, 6.52; N, 16.38.

*Example XIX.—N-(2- benzimidazolylmethyl)-N-phenyl-N',N'-dimethyl-1,3-propanediamine*

By replacing the N-phenyl-N',N'-dimethylethylenediamine hydrochloride employed in Example III by an equimolecular quantity of N-phenyl-N',N'-dimethyl-1,3-propanediamine hydrochloride and following substantially the same procedure described in Example III, there was obtained N-(2-benzimidazoylylmethyl)-N-phenyl-N',N'-dimethyl-1,3-propanediamine, M. P. 187–188° C.

*Analysis.*—Calculated for $C_{19}H_{24}N_4$: C, 73.99; H, 7.84; N, 18.17. Found: C, 74.08; H, 7.94; N, 18.22.

*Example XX.—N-(1-methyl-2-benzimidazolylmethyl)-N-phenyl-N',N'-dimethyl-1,3- propanediamine hydrochloride*

By replacing the 2-chloromethylbenzimidazole and the N-phenyl-N',N'-dimethylethylenediamine hydrochloride employed in Example III by equimolecular quantities of 1-methyl-2-chloromethylbenzimidazole and N-phenyl-N',N'-dimethyl,1,3-propanediamine hydrochloride respectively and following substantially the same procedure described in Example III, there was obtained N-(1- methyl-2- benzimidazolylmethyl)-N- phenyl- N',N'-dimethyl-1,3-propanediamine which was isolated as the mono-hydrochloride, M. P. 182–183° C.

*Analysis.*—Calculated for $C_{20}H_{26}N_4 \cdot HCl$: C, 66.93; H, 7.58; N, 15.61. Found: C, 67.02; H, 7.44; N, 15.47.

*Example XXI.—N-[5(6)- chloro-2- benzimidazolylmethyl]-N-phenyl-N',N'-dimethylethylenediamine hydrochloride*

By replacing the 2-chloromethylbenzimidazole employed in Example III by an equimolecular quantity of 5(6)-chloro-2-chloromethylbenzimidazole and following substantially the same procedure described in Example III, there was obtained N-[5(6)-chloro-2-benzimidazolylmethyl]- N- phenyl- N',N'- dimethylethylenediamine, M. P. 174–175° C.

*Analysis.*—Calculated for $C_{18}H_{21}N_4Cl$: C, 65.74; H, 6.44; N, 17.04. Found: C, 65.79; H, 6.38; N, 16.97.

The N- [5(6)- chloro- 2- benzimidazolylmethyl]- N-phenyl - N',N' - dimethylethylenediamine hydrochloride was obtained as a white crystalline solid, M. P. 162–163° C.

*Analysis.*—Calculated for $C_{18}H_{21}N_4Cl \cdot HCl$: C, 59.19; H, 6.07; N, 15.34. Found: C, 59.25; H, 6.05; N, 15.31.

*Example XXII.—N - [5(6)- chloro - 2 - benzimidazolylmethyl]-N-phenyl-N',N'-diethylethylenediamine*

By replacing the 2-chloromethylbenzimidazole and the N-phenyl-N',N'-dimethylethylenediamine hydrochloride employed in Example III by equimolecular quantities of 5(6)-chloro-2-chloromethylbenzimidazole and N-phenyl-N',N'-diethylethylenediamine hydrochloride respectively and following substantially the same procedure described in Example III, there was obtained N-[5(6)-chloro-2-benzimidazolylmethyl]- N- phenyl- N',N'- diethylethylenediamine, M. P. 107–108° C.

*Analysis.*—Calculated for $C_{20}H_{25}N_4Cl$: C, 67.30; H, 7.06; N, 15.70. Found: C, 67.34; H, 6.93; N, 15.66.

*Example XXIII.—N - [5(6) - chloro- 2- benzimidazolylmethyl]-N-phenyl-2-(1-piperidyl)-ethylamine hydrochloride*

By replacing the 2-chloromethylbenzimidazole and the N-phenyl-N',N'- dimethylethylenediamine hydochloride employed in Example III by equimolecular quantities of 5(6)-chloro-2-chloromethylbenzimidazole and N-phenyl-2-(1-piperidyl)-ethylamine hydrochloride respectively and following susbtantially the same procedure described in Example III, there was obtained N-[5(6)-chloro-2-benzimidazolylmethyl]- N- phenyl-2-(1- piperidyl)- ethylamine. The N-[5(6)-chloro-2-benzimidazolyl-methyl]-N-phenyl-2-(1-piperidyl)-ethylamine hydrochloride melts at 213–214° C.

*Analysis.*—Calculated for $C_{21}H_{25}N_4Cl \cdot HCl$: C, 62.22; H, 6.47; N, 13.82. Found: C, 62.16; H, 6.50; N, 13.66.

*Example XXIV.—N- (5,6 - dichloro - 2- benzimidazolylmethyl)-N-phenyl-N',N'-dimethylethylenediamine*

By replacing the 2-chloromethylbenzimidazole employed in Example III by an equimolecular quantity of 5,6-dichloro-2-chloromethylbenzimidazole and following substantially the same procedure described in Example III, there is obtained N-(5,6-dichlorobenzimidazolyl-methyl)-N-phenyl-N',N'-dimethylethylenediamine.

*Example XXV.—N - [4(7) - propoxy - 2 - benzimidazolylmethyl] - N - (2 - ethylphenyl) - N' - methyl - N'-propylethylenediamine*

By replacing the 2-chloromethylbenzimidazole and the N-phenyl-N',N'-dimethylethylenediamine hydrochloride employed in Example III by equimolecular quantities of 2-chloromethyl-4-propoxybenzimidazole and N-(2-ethylphenyl)-N'-methyl-N'-propylethylenediamine hydrochloride respectively and following substantially the same procedure described in Example III, there is obtained N - [4(7) - propoxy - 2 - benzimidazolylmethyl] - N(2 - ethylphenyl) - N' - methyl - N' - propylethylenediamine.

*Example XXVI.—N - [4(7) - butyl - 2 - benzimidazolylmethyl]-N-phenyl-2-(1-pyrrolidyl)-ethylamine*

By replacing the 2-chloromethylbenzimidazole and the N-phenyl-N',N'-dimethylethylenediamine hydrochloride employed in Example III by equimolecular quantities of 2-chloromethyl-4(7)-butylbenzimidazole and N-phenyl-2-(1-pyrrolidyl)-ethylamine hydrochloride respectively and following substantially the same procedure described in Example III, there is obtained N-[4(7)-butyl-2-benzimidazolylmethyl]-N-phenyl-2-(1-pyrrolidyl)-ethylamine.

*Example XXVII.—N - (1 - n - butyl - 2 - benzimidazolylmethyl) - N - phenyl - N', N' - dimethylethylenediamine*

2-hydroxymethylbenzimidazole, 14.8 g. (0.1 mole), was dissolved in 65 ml. of isopropyl alcohol by warming on a steam-bath. A solution of 4.0 g. (0.1 mole) of sodium hydroxide in 12 ml. of water was added followed by n-butyl bromide, 13.7 g. (0.1 mole). The mixture was refluxed for 30 minutes on the steam-bath. The solution was poured into a mixture of 150 g. of ice and 50 ml. of water. An oil separated that was removed. The aqueous layer was concentrated to half its original volume, combined with the oil and the mixture extracted with three 50 ml. portions of benzene. Evaporation of the benzene left a viscous dark brown oil. Crystallization from ether followed by recrystallization from cyclohexane gave 4.93 g. (24.1%) of 1-n-butyl-2-hydroxymethylbenzimidazole, M. P. 97° C. (softened at 92° C.). Further recrystallization from cyclohexane, followed by recrystallization from an alcohol-water mixture gave 1-n-butyl-2-hydroxymethylbenzimidazole, M. P. 101–102° C.

METHOD C

*Example XXVIII.—N - (1 - methyl - 2 - benzimidazolylmethyl) - N - phenyl - N',N' - dimethylethylenediamine*

A mixture of 10.7 g. (0.0652 mole) of N-phenyl-N',N'-dimethylethylenediamine, lithium amide, 1.57 g. (0.0652 mole), and toluene, 100 ml., was refluxed with stirring until evolution of ammonia was complete. The mixture was cooled to room temperature and a solution of 1-methyl-2-chloromethylbenzimidazole, 11.76 g. (0.065 mole), in 75 ml. of toluene added dropwise keeping the temperature at 25-30° C. Considerable heat was evolved. The mixture was stirred and refluxed for 1 hour. The lithium chloride was separated by filtration, the toluene layer was washed with water and extracted with 200 ml. of 10% hydrochloric acid. The extract was made basic with sodium hydroxide and the red oily product taken up in 200 ml. of ether. After washing with water the ether was evaporated and the residual brown oil was treated with a solution of 33 g. of picric acid in 300 ml. of alcohol (3A). The crude picrate was boiled with two successive 250 ml. portions of dilute (3.7%) hydrochloric acid. The insoluble material was extracted with two successive 200 ml. portions of boiling alcohol (3A). The insoluble material, M. P. 208-209° C. (dec.), weighed 19.15 g. Recrystallization from glacial acetic acid gave 17.0 g. of N - (1 - methyl - 2 - benzimidazolylmethyl) - N - phenyl - N', N' - dimethylethylenediamine picrate, M. P. 209-210° C. (dec.).

The picrate was decomposed by shaking with 400 ml. of saturated lithium hydroxide and 500 ml. of ether. The ether layer was washed with water and dried over sodium sulfate. Evaporation of the ether left 5.6 g. of N - (1 - methyl - 2 - benzimidazolylmethyl) - N - phenyl - N',N' - dimethylethylenediamine, M. P. 94.5–95° C. Recrystallization from hexane gave material melting at 95–95.5° C.

*Analysis.*—Calculated for $C_{19}H_{24}N_4$: C, 73.99; H, 7.84; N, 18.17. Found: C, 73.92; H, 7.76; N, 18.13.

METHOD D

*Example XXIX.—N - [5(6) - methyl - 2 - benzimidazolylmethyl] - N - phenyl - N',N' - dimethylethylenediamine*

Step A.—Formaldehyde, 98.8 g. of a 37% solution (1.22 mole), was added dropwise with cooling and stirring to a solution of sodium bisulfite, 126.8 g. (1.22 mole), in water, 366 ml. N-phenyl-N',N'-dimethylethylenediamine, 100 g. (0.609 mole), was added and the mixture heated on the steam-bath with stirring for 30 minutes. Potassium cyanide, 125 g. (1.83 mole), was added and the stirring and heating continued for 1 hour. The mixture was cooled in an ice bath for 1 hour. The two-phase mixture was extracted with 400 ml. of benzene and the extracts dried over sodium sulfate. After evaporation of the benzene, the product, N-cyanomethyl-N-phenyl-N',N'-dimethylethylenediamine, was distilled through a modified Claisen flask (Vigreux column). The yield of twice-distilled product, B. P. 130–133° (0.3 mm.), $n_D^{25}$, 1.5388 was 64.5 g. (53%). The picrate was prepared and recrystallized from alcohol, M. P. 138–139° C.

*Analysis.*—Calculated for $C_{12}H_{17}N_3 \cdot C_6H_3O_7N_3$: N, 19.44. Found: N, 19.22.

The hydrochloride melted at 154.5–155.5° C. after recrystallization from absolute alcohol.

*Analysis.*—Calculated for $C_{12}H_{17}N_3 \cdot HCl$: C, 60.11; H, 7.57; N, 17.53. Found: C, 60.06, H, 7.65, N, 17.49.

Step B.—Thirty-three grams (0.163 mole) of the thus obtained N-cyanomethyl-N-phenyl-N',N'-dimethylethylenediamine was added dropwise to 65 ml. of concentrated sulfuric acid over a 15 minute period while keeping the temperature below 50° C. The mixture was stirred for 30 minutes after the addition was complete, then poured into ice water. The solution was made alkaline by the addition of 250 ml. of 10N sodium hydroxide and extracted with three 150 ml. portions of benzene. Evaporation of the benzene and crystallization of the residue from benzene-hexane gave 18.75 g. (52%) of N-carbamylmethyl-N-phenyl-N',N'-dimethylethylenediamine, M. P. 111–112° C. An analytical sample prepared by further recrystallization melted at 111–112° C.

*Analysis.*—Calculated for $C_{12}H_{19}ON_3$: C. 65.13; H, 8.65; N, 18.99. Found: C, 65.18; H, 8.48; N, 18.82.

Step C.—A mixture of N-carbamylmethyl-N-phenyl-N',N'-dimethylethylenediamine, 4.42 g. (0.02 mole), 4-methyl-1,2-phenylenediamine dihydrochloride, 3.90 g. (0.02 mole), and ethylene glycol, 12 ml., was heated to refluxing for 3 hours. The mixture was cooled and poured into 100 ml. of water. The solution was filtered through diatomaceous earth and made basic with sodium hydroxide. The mixture was extracted with 150 ml. of benzene, the extracts dried over sodium sulfate and the solvent evaporated on the steam-bath. Crystallization from alcohol-water gave 3.51 g. (57%) of N-[5(6)-methyl-2-benzimidazolylmethyl]-N-phenyl-N',N'-dimethylethylenediamine, M. P. 137–139° C. After further recrystallization from alcohol-water the product melted at 138–139° C.

*Analysis.*—Calculated for $C_{19}H_{24}N_4$: C, 73.99; H, 7.84; N, 18.17. Found: C, 74.03; H, 7.71; N, 18.13.

*Example XXX.—N-(2-benzimidazolylmethyl)-N-phenyl-N',N'dimethylethylenediamine*

By replacing the 4-methyl-1,2-phenylenediamine dihydrochloride employed in Example XXIX by an equimolecular quantity of 1,2-phenylenediamine dihydrochloride and following substantially the same procedure described in Example XXIX, there was obtained N-(2-benzimidazolylmethyl)-N-phenyl-N',N' - dimethylethylenediamine, M. P. 185–187° C. The mixed melting point with an authentic specimen was 185–189° C.

*Example XXXI.—N-(5,6-dimethyl-2-benzimidazolylmethyl)-N-phenyl-N',N'-dimethylethylenediamine*

By replacing the 4-methyl-1,2-phenylenediamine dihydrochloride employed in Example XXIX by an equimolecular quantity of 4,5-dimethyl-1,2-phenylenediamine dihydrochloride and following substantially the same procedure described in Example XXIX, there was obtained N - (5,6-dimethyl-2-benzimidazolylmethyl) - N - phenyl-N',N'-dimethylethylenediamine, M. P. 152–153° C.

*Analysis.*—Calculated for $C_{20}H_{26}N_4$: C, 74.49; H, 8.13; N, 17.38. Found: C, 74.40; H, 8.17; N, 17.26.

*Example XXXII.—N - [5(6)-chloro - 2 - benzimidazolylmethyl] - N-phenyl-2-aminoethyl - trimethylammonium chloride hydrochloride*

N-[5(6) - chloro-2-benzimidazolylmethyl] - N - phenyl-N',N'-dimethylethylenediamine, 12.0 g. (0.0365 mole), prepared as described in Example XXI was dissolved in 150 ml. of absolute methanol. Methyl iodide, 5.16 g. (0.0365 mole), was added followed by 30 ml. of methanol and the solution, contained in a tightly stoppered flask, allowed to stand in the dark at 23–25° C. for 90 hours. The solvent then was evaporated under reduced pressure at 40–50° C. The amorphous methiodide was converted to the chloride hydrochloride by the method of A. P. Phillips and R. Baltzly, J. Am. Chem. Soc. 74, 5231 (1952). The product was recrystallized from a mixture of methanol and acetone. The yield of N-[5(6)-chloro-2-benzimidazolylmethyl] - N - phenyl - 2 - aminoethyl - trimethylammonium chloride hydrochloride, M. P. 179–180° C. was 10.15 g. (67%).

*Analysis.*—Calculated for $C_{19}H_{24}N_4Cl_2 \cdot HCl$: C, 54.62; H, 6.03; N, 13.44. Found: C, 54.80; H, 5.90; N, 13.47.

While the invention has been illustrated by particular 2-aminomethylbenzimidazoles, the invention embraces the chemical equivalents of the specifically identified compounds as well as their acid addition salts and quaternary ammonium derivatives.

Similarly, while certain novel methods have been illustrated for the preparation of the compounds of this invention in which specific conditions have been described, these conditions can be modified, as previously indicated, without departing from the scope or intent of this invention.

What is claimed is:
1. A 2-aminomethylbenzimidazole having the general formula

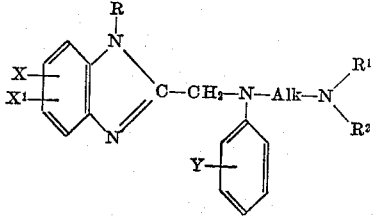

and its acid addition salts and quaternary ammonium derivatives, wherein X, X¹ and Y respectively are selected from the group consisting of hydrogen, halogen, lower-alkyl and lower-alkoxy radicals; R is selected from the group consisting of hydrogen and lower-alkyl; Alk is a lower alkylene chain and

is a tertiary amino radical selected from the group consisting of a di-lower alkyl amino, pyrrolidyl, piperidyl and morpholinyl radicals.

2. N-[5(6)-chloro-2-benzimidazolylmethyl]-N-phenyl-N',N'-dimethylethylenediamine.

3. N-(2-benzimidazolylmethyl)-N-(methoxyphenyl)-2-(1-piperidyl)-ethylamine.

4. N-[5(6)-chloro-2-benzimidazolylmethyl]-N-phenyl-2-(1-piperidyl)-ethylamine.

5. A method for the preparation of a 2-aminomethylbenzimidazole comprising condensing a 2-halomethylbenzimidazole having the general formula

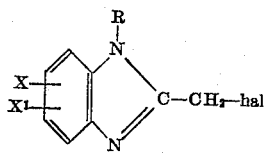

wherein X and X¹ respectively are selected from the group consisting of hydrogen, halogen, lower-alkyl and lower-alkoxy radicals; R is selected from the group consisting of hydrogen and lower-alkyl; and hal is a halogen radical, with a diamine having the general formula

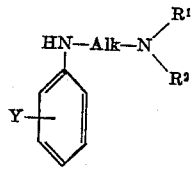

wherein Y is selected from the group consisting of hydrogen, halogen, lower-alkyl and lower-alkoxy radicals; Alk is a lower alkylene chain; and

is a tertiary amino radical selected from the group consisting of a di-lower alkyl amino, pyrrolidyl, piperidyl, and morpholinyl radicals, in the presence of a catalytic amount of sodium iodide and a polar anhydrous solvent.

6. A method as claimed in claim 5, wherein a monomineral acid addition salt of the diamine is employed in the condensation with the 2-halomethylbenzimidazole.

7. A method as claimed in claim 5, wherein the 2-halomethylbenzimidazole is condensed with a monomineral acid addition salt of the diamine in the presence of an anhydrous solvent selected from the group consisting of methyl alcohol, absolute ethyl alcohol and mixtures thereof, isopropyl alcohol, acetonitrile, and a mixture of ethyl alcohol and acetone and at a temperature between about 50 to 100° C.

8. A method as claimed in claim 5, wherein the condensation is carried out at a temperature between about 50 to 100° C.

9. A method for the preparation of N-[5(6)-chloro-2 - benzimidazolylmethyl] - N - phenyl - N',N'-dimethylethylenediamine which comprises condensing a 5(6)-chloro-2-halomethylbenzimidazole with a N-phenyl-N',N'-dimethylethylenediamine hydrohalide in the presence of sodium iodide and a polar anhydrous solvent.

10. A method for the preparation of N-[5(6)-chloro-2-benzimidazolylmethyl]-N-phenyl-N',N' - dimethylethylenediamine which comprises condensing 5(6)-chloro-2-chloromethylbenzimidazole with N - phenyl - N',N' - dimethylethylenediamine hydrochloride in the presence of sodium iodide and absolute alcohol at a temperature between about 50 to 100° C.

References Cited in the file of this patent
Simons: Industrial and Engineering Chemistry, vol. 39 (1947) page 238.

UNITED STATES PATENT OFFICE
CERTIFICATE OF CORRECTION

October 21, 1958

Patent No. 2,857,391

Edward L. Engelhardt et al

It is hereby certified that error appears in the printed specification of the above numbered patent requiring correction and that the said Letters Patent should read as corrected below.

Column 3, line 57, for "allkyl-" read -- alkyl- --; column 9, line 2, for "meth", in italics, read -- methyl --, in italics; line 13, for "$C_{19}H_{23}N_4Ci$:" read -- $C_{19}H_{23}N_4Cl$: --; line 22, for "N-(2-benzimidazoylyl-methyl)-" read -- N-(2-benzimidazolylmethyl)- --; line 35, for "-dimethyl, 1,3-" read -- -dimethyl-1,3- --; column 12, line 68, for "N, 13.44." read -- N, 13.41. --.

Signed and sealed this 22nd day of December 1959.

(SEAL)
Attest:

KARL H. AXLINE
Attesting Officer

ROBERT C. WATSON
Commissioner of Patents